(12) United States Patent
Visscher

(10) Patent No.: US 9,539,856 B2
(45) Date of Patent: Jan. 10, 2017

(54) WHEEL

(71) Applicant: ONTARIO DRIVE & GEAR LIMITED, New Hamburg (CA)

(72) Inventor: Peter Derek Visscher, Lakeside (CA)

(73) Assignee: Ontario Drive & Gear Limited, New Hamburg, Ontario (CA)

( * ) Notice: Subject to any disclaimer, the term of this patent is extended or adjusted under 35 U.S.C. 154(b) by 694 days.

(21) Appl. No.: 13/901,916

(22) Filed: May 24, 2013

(65) Prior Publication Data

US 2014/0345761 A1    Nov. 27, 2014

(51) Int. Cl.
*B60B 9/04*    (2006.01)
*B60B 15/20*    (2006.01)

(52) U.S. Cl.
CPC ............ *B60B 15/20* (2013.01); *B60Y 2200/46* (2013.01)

(58) Field of Classification Search
CPC ......... B60B 15/20; B60B 9/04; B60Y 2200/46
USPC .......................... 152/1, 5, 7, 11, 12, 323, 324
See application file for complete search history.

(56) References Cited

U.S. PATENT DOCUMENTS

| 3,698,461 | A | * | 10/1972 | Markow | B60B 5/02 |
|||||| 152/5 |
| 3,773,394 | A | * | 11/1973 | Grawey | B60B 15/04 |
|||||| 152/185.1 |
| 5,743,316 | A | * | 4/1998 | Chrobak | B60B 9/04 |
|||||| 152/11 |
| 5,947,051 | A | * | 9/1999 | Geiger | B62D 57/00 |
|||||| 114/222 |
| 2011/0240189 | A1 | | 10/2011 | Dutton | |
| 2012/0279622 | A1 | * | 11/2012 | Russell | B60B 9/26 |
|||||| 152/17 |

FOREIGN PATENT DOCUMENTS

| CA | 2817138 | | 11/2013 |
| EP | 2338695 | A1 | 6/2011 |
| WO | WO2008/071873 | A1 | 6/2008 |

\* cited by examiner

*Primary Examiner* — S. Joseph Morano
*Assistant Examiner* — Jean Charleston
(74) *Attorney, Agent, or Firm* — Anthony Asquith Corp.

(57) ABSTRACT

The wheel is all-metal, and is suitable for use on the moon. The wheel includes tread-plates mounted on leaf-springs, which deflect to permit suspension movement. The leaf-springs are flexible, light, and thin, yet are made strong enough to cope with heavy traction forces by the provision of hoop-cables, which link all the tread-plates together.

23 Claims, 9 Drawing Sheets

WHEEL

This technology relates to wheels for use in a non-earth environment, for example on a lunar rover, for traversing over the moon regolith.

Some of the desiderata for such a wheel may be summarized as:
- the wheel should be all metal;
- the tread should be compliant and able to conform elastically resiliently to surface features which are highly uneven, and include sharp-edged pebbles, stones, rocks, etc;
- the wheel, as a unitary structure, should be lightweight but strong;
- the particles of the moon regolith, being electrostatically charged, tend to adhere, and the arrangements of the components of the wheel should avoid nooks and crannies in such locations that an agglomeration might affect performance of the wheel;
- the components of the wheel that move relatively should be spaced from each other to minimize the opportunity for contact, the friction from which might impair performance;
- the wheel should be able to accommodate abusive impacts and shock-loads, such as arise due to bumps and falls, when transporting designed loads;
- the wheel should retain structural integrity despite wide, and sometimes rapid, variations of temperature.

LIST OF THE DRAWINGS

Figure 1:
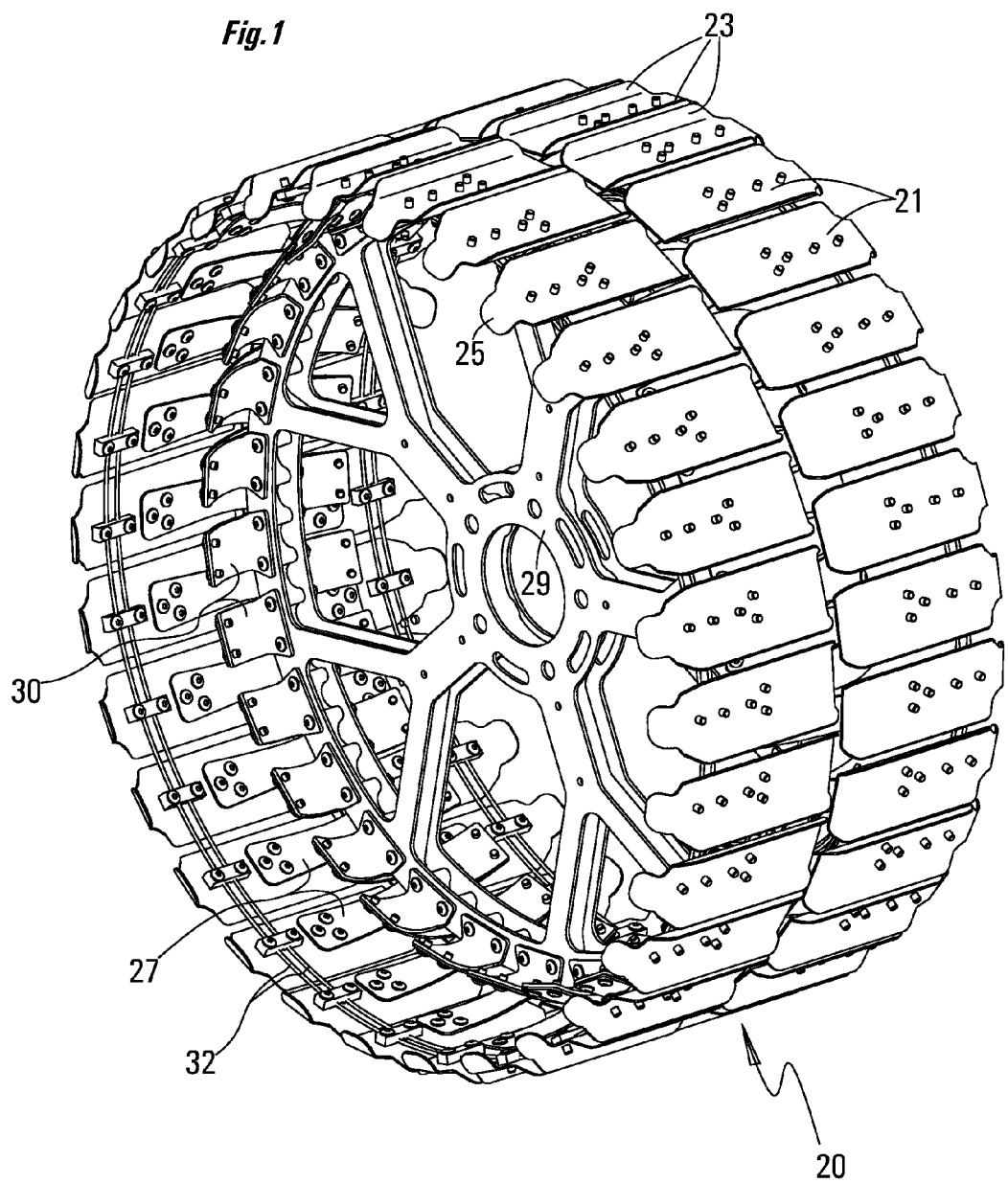
FIG. 1 is a pictorial view of an all-metal wheel that embodies claim 1.
Figure 2:
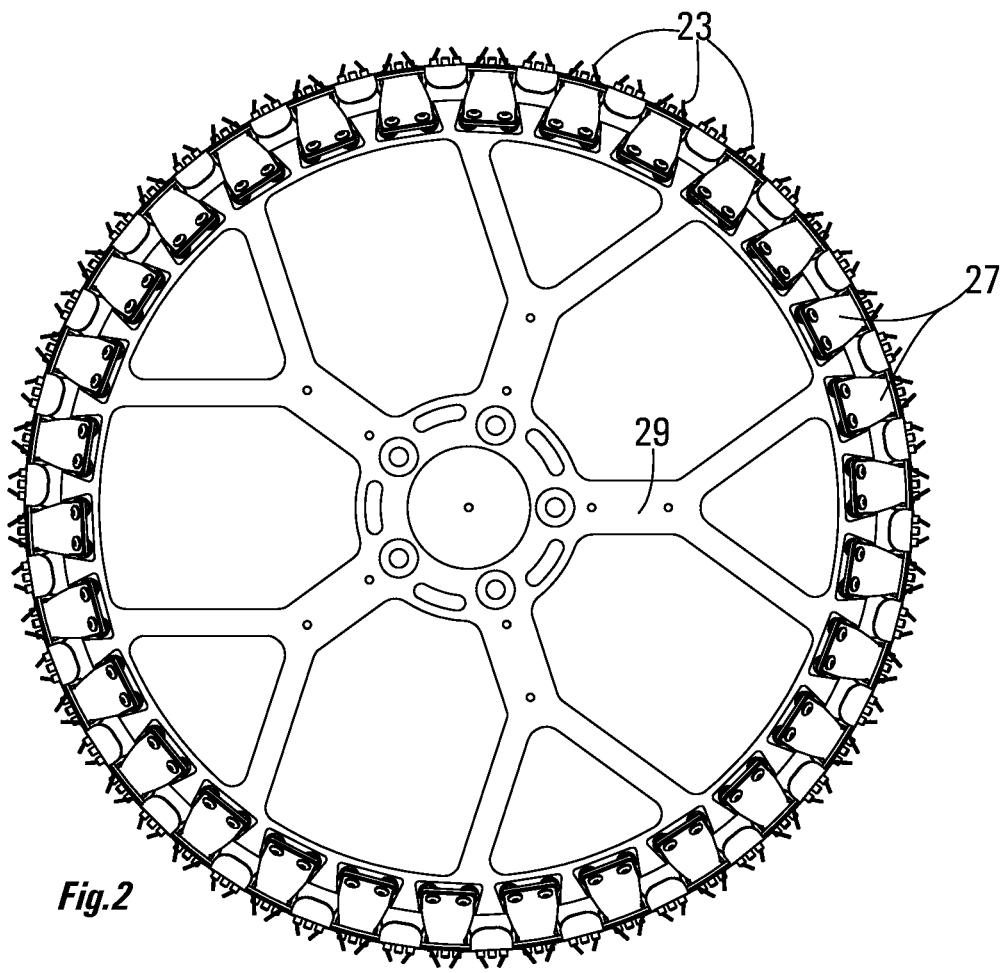
FIG. 2 is a side-elevation of the wheel of FIG. 1.
Figure 3:
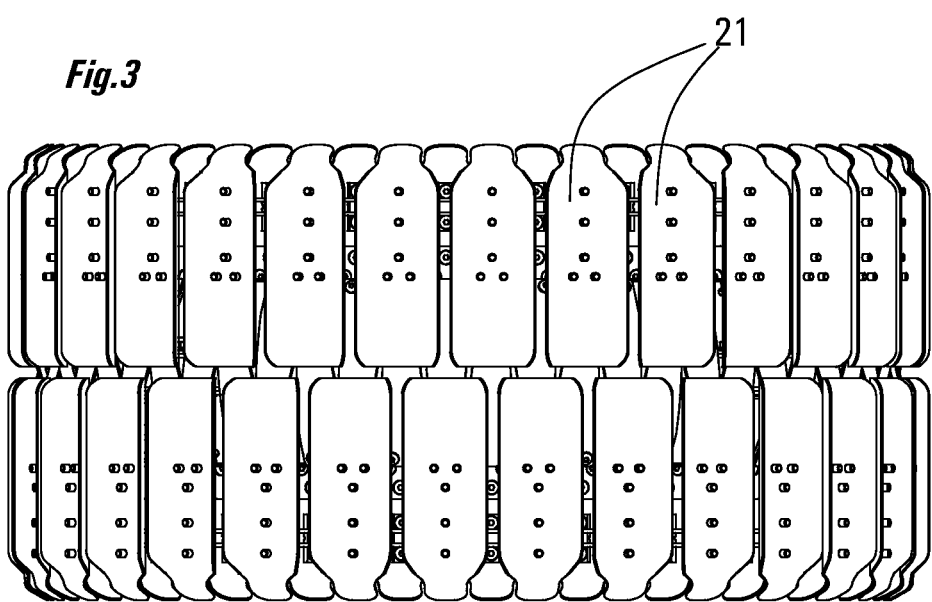
FIG. 3 is a plan-view of the wheel of FIG. 1.
Figure 4:
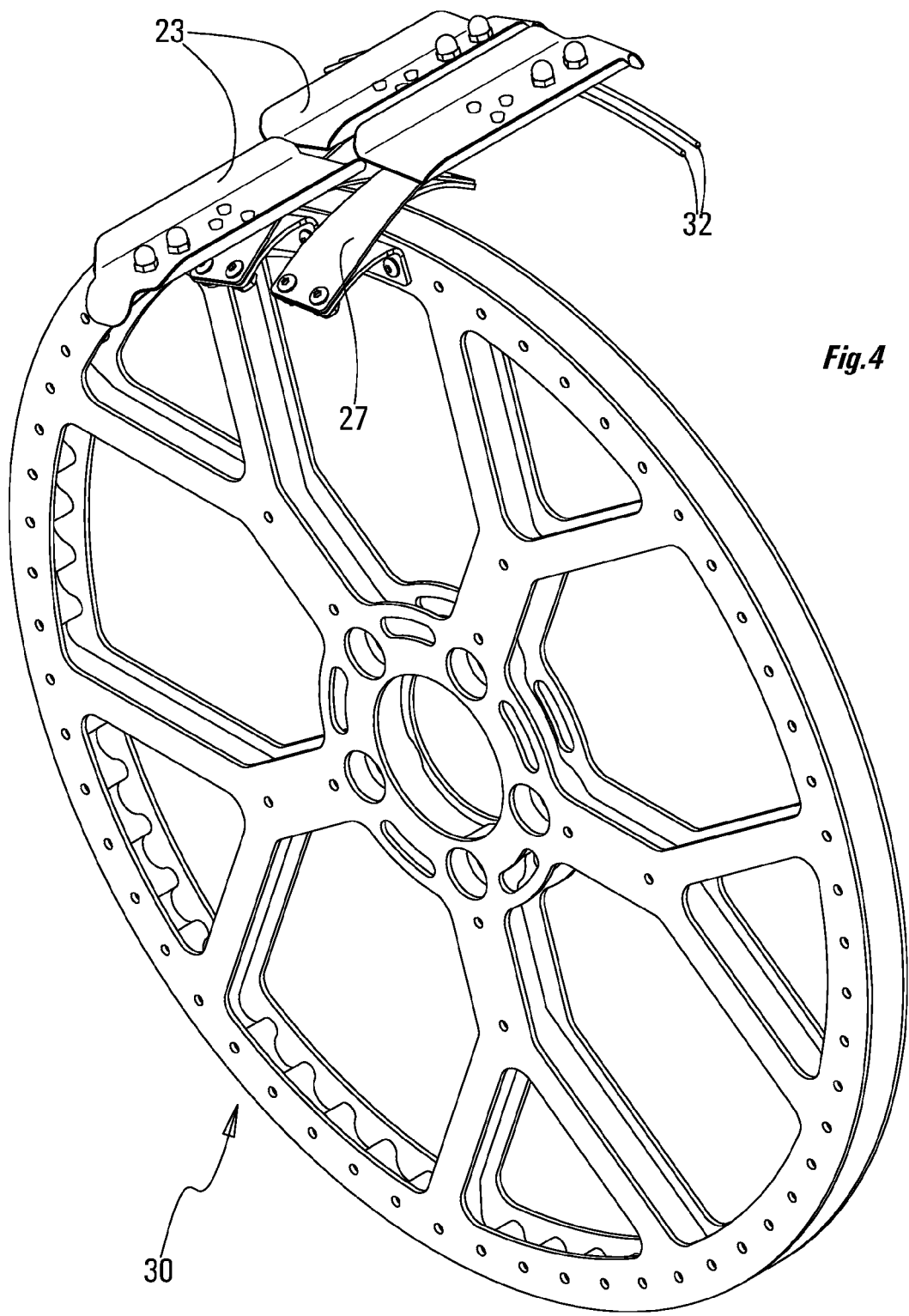
FIG. 4 is the same view as FIG. 1, but omits many of the components, for illustration.
Figure 9:
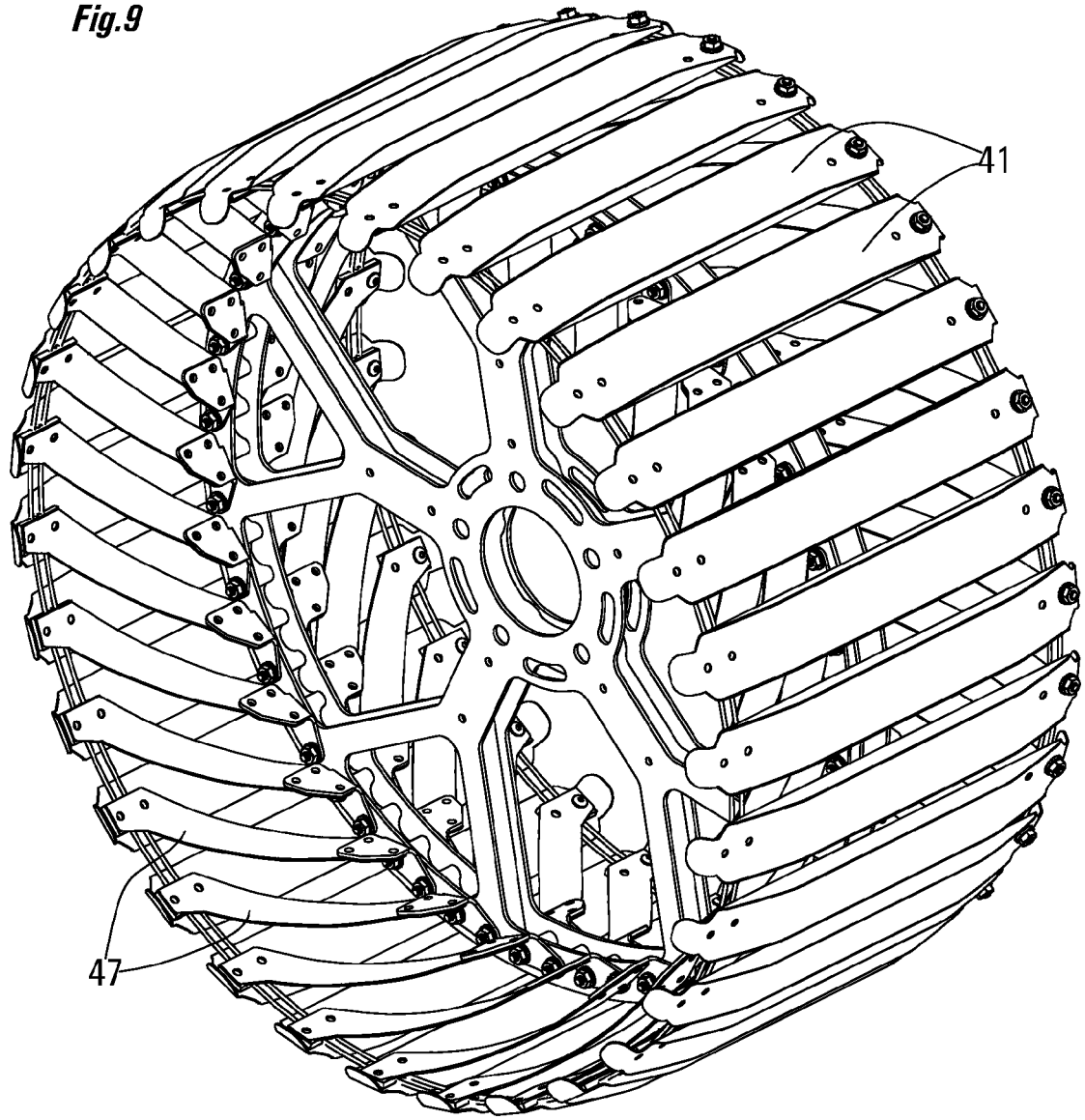
FIG. 9 is a pictorial view of another all-metal wheel that embodies claim 1.
Figure 10:
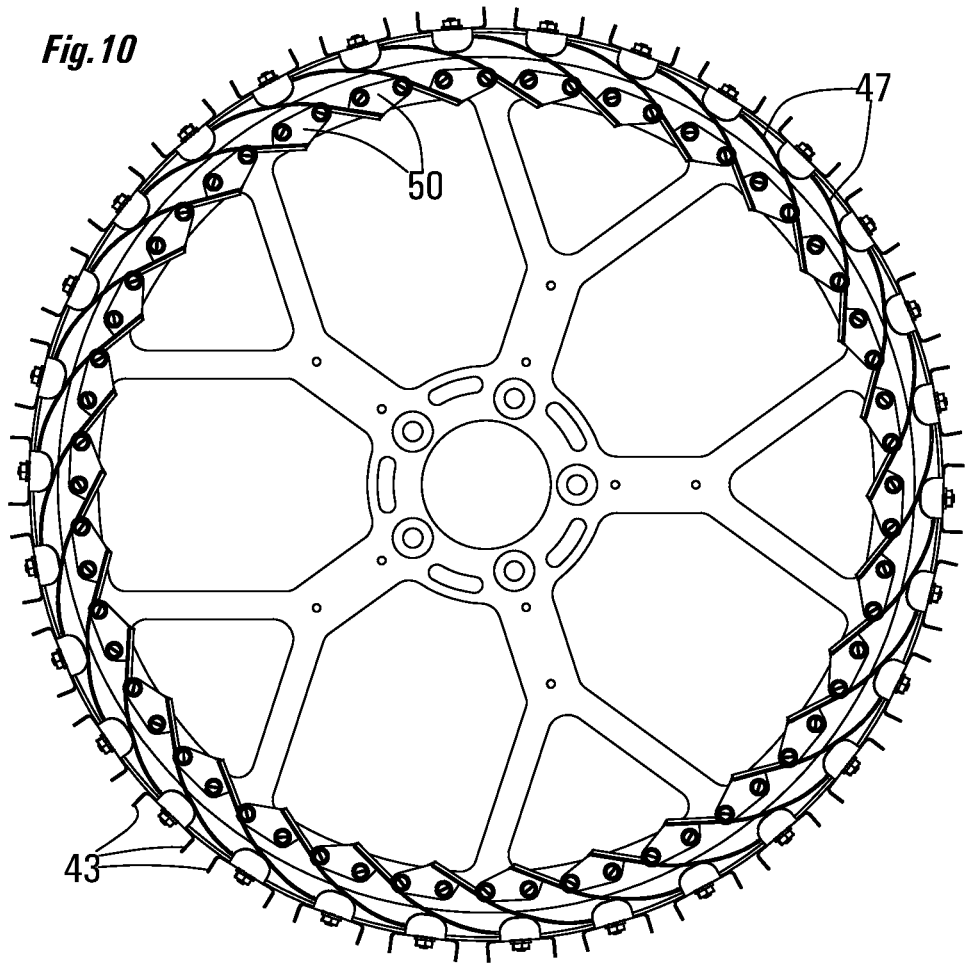
Figure 11:
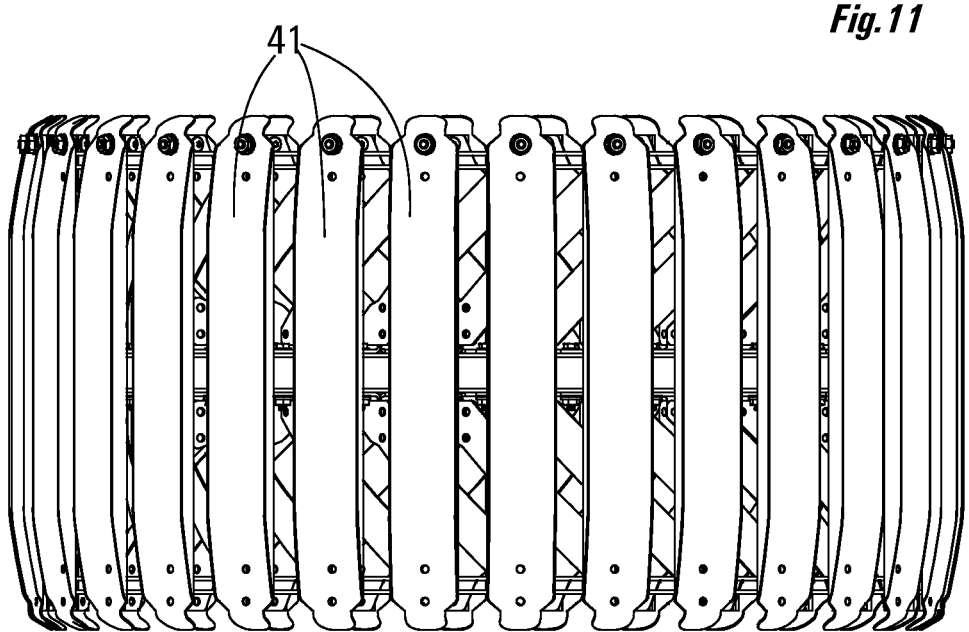
Figure 12:
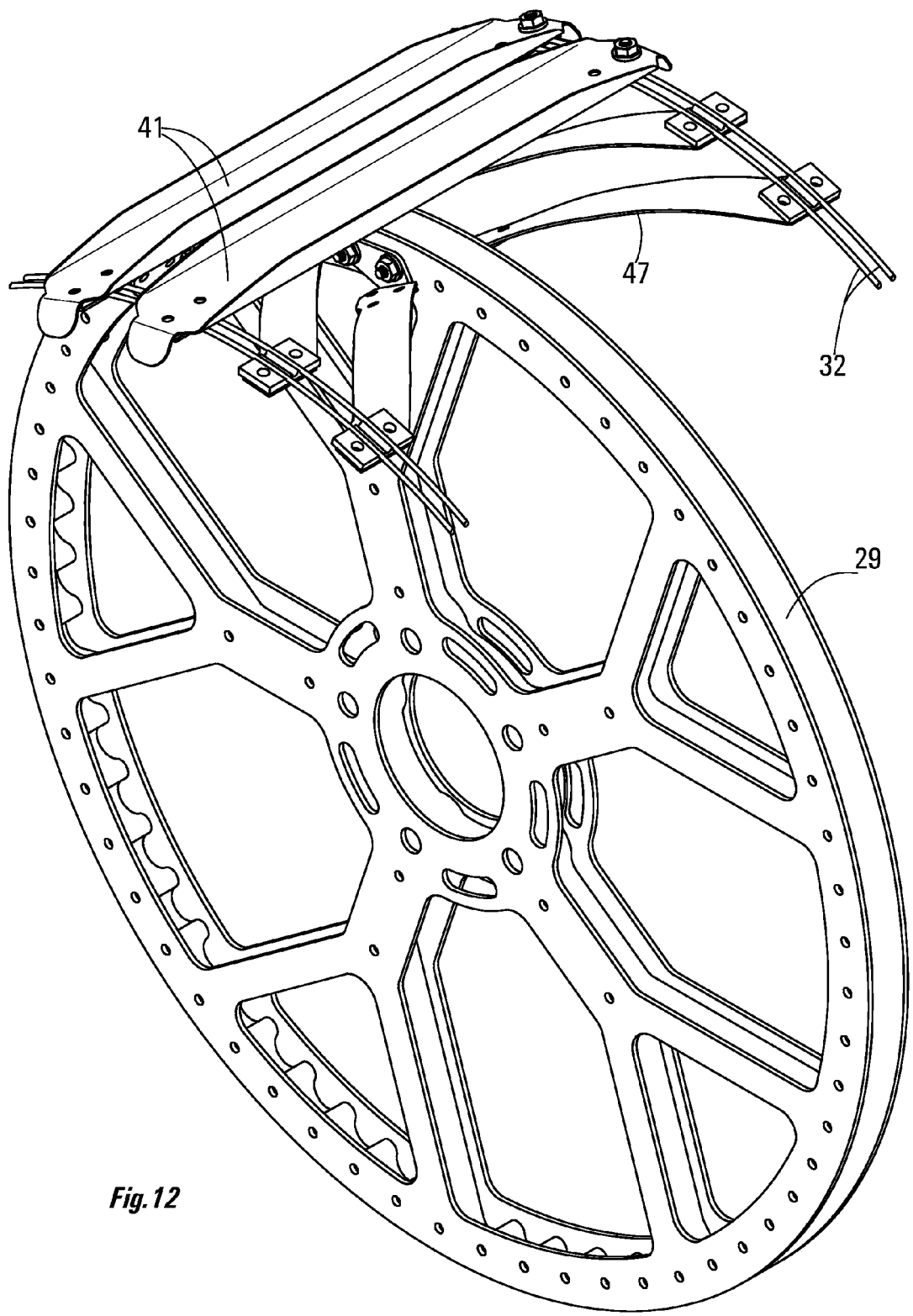

FIGS. 10, 11, 12 correspond to FIG. 9, as FIGS. 2, 3, 4 correspond to FIG. 1.

Figure 13:
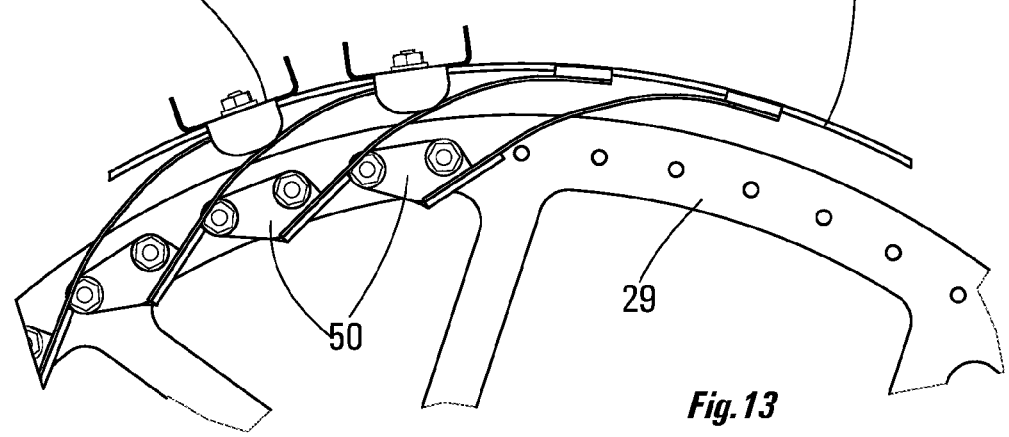

FIG. 13 is a side-view showing some of the tread components of the wheel.

Figure 14:
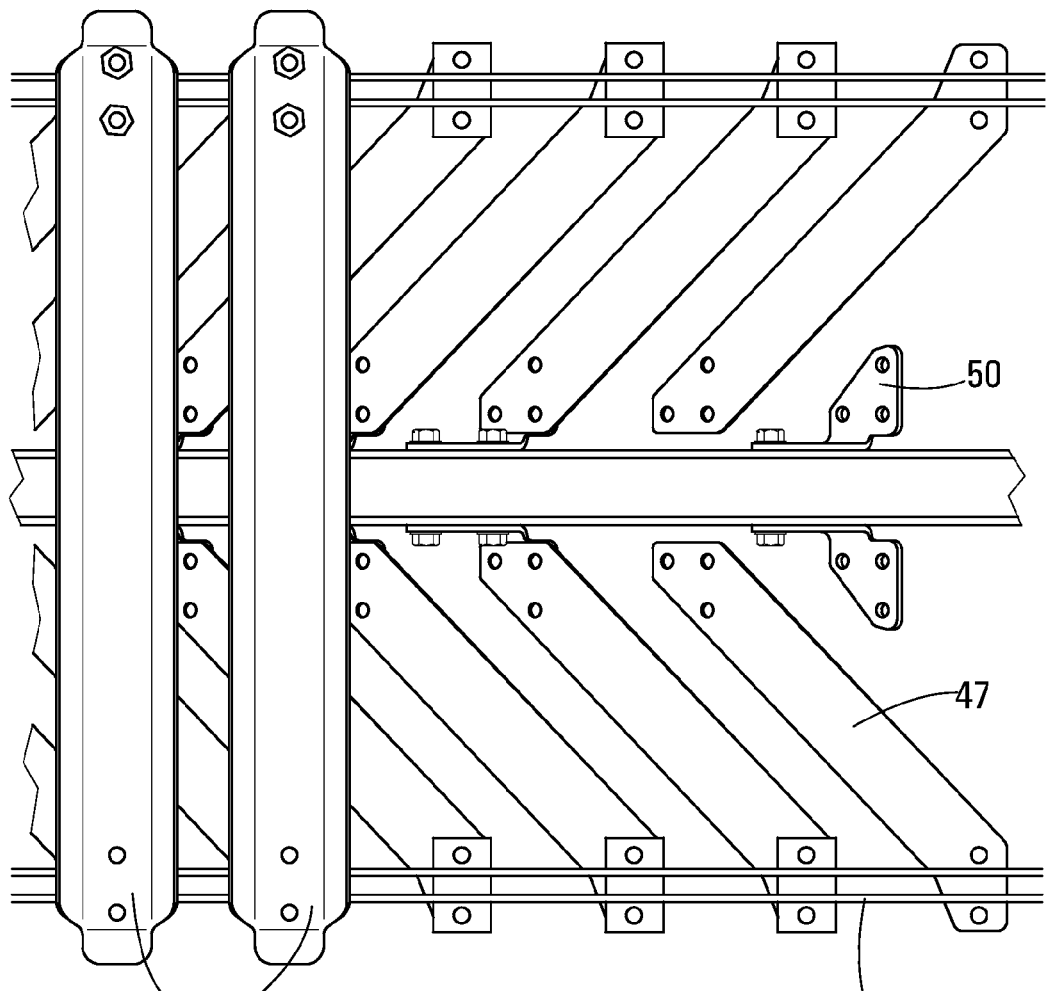

FIG. 14 is a diagrammatic plan view of the wheel of FIG. 9, shown as if the circumference of the wheel were laid flat.

In the exemplary wheel 20 shown in FIGS. 1-8, tread-plates 21 comprise individual pieces of sheet-titanium, which are bent upwards to create traction-lugs or grousers 23 (two per tread-plate). As shown, the resulting tread is aggressive, and designed to give good traction and grip on the moon surface. Also, the bent-up grousers 23 add strength and rigidity to the tread-plates 21, which enables designers to specify that the sheet metal (e.g titanium) of the tread-plates can be thin.

The ends of the tread-plates are formed with side-lugs 25, which serve to provide centralizing alignment for the wheels when rolling over rough terrain.

The leaf-spring 27, as shown, has a considerable length. This means that the leaf-spring 27 can readily be designed such that the distal end of the leaf-spring can deflect a distance of e.g two cm, under load, at a more or less constant (and relatively low) rate, without the spring being over-stressed. It may be noted that the deflection of the leaf-spring, radially inwards, is limited in that the leaf-spring bottoms against the outer radius of the rim of the rim-spokes-hub-unit 29 of the wheel 20, if overloaded.

This protection against overloading enables the spring designers to set the spring force and spring rate of the leaf-spring 27 to suit the normal loading and suspension travel required of the wheel 20, without having to compromise these parameters to cater for the abuse condition. (However, the designers should make the springs sufficiently strong that the abuse condition occurs only rarely.)

Generally, all the suspension movement takes place in the wheel (i.e the vehicle makes no provision for the axles to move up/down relative to the body of the vehicle) by deflection of whichever one(s) of the tread-spring/tread-plate unit(s) are in touching contact with the ground. Each tread-plate 21 moves predominantly radially with respect to the axis of the rim-spokes-hub-unit 29 of the wheel 20, as it takes the load. Because of the way the leaf-spring 27 and its mounting bracket 30 are configured, the up/down movement of the tread-plate 21, under load, is basically directly radial. The leaf-spring 27 is bolted flat-on to the mounting face of the bracket 30, and thereby constrains the tread-plate 21 to move radially, and inhibits the tread-plate against rotating, tipping, and twisting.

At the same time, the leaf-spring 27 is somewhat compliant in the tipping and twisting modes, whereby, over rough terrain, the tread-plate 21 can accommodate itself to the unevenness of the ground. (The manner in which the tread-plates cope with modes of movement other than up/down movement is explained later.)

Thus, each tread-plate 21, as it takes the load, moves predominantly radially (i.e radially relative to the axis of the wheel 20)—but if tipping and twisting should be required, those modes of movement can take place. The shape of the leaf-spring 27 ensures the tread-plate 21 is returned or reset back to its unstressed neutral position as the tread-plate 21 becomes once again unloaded.

It may be noted that the deflection movements of the tread-plate 21 and the leaf-spring 27 take place substantially without friction. The contact between the grousers 23 and the ground surface involves some slippage of the edges or tips of the grousers over the ground material, in which some friction will be induced, but the deflection of the tread-plate 21 against the resilience of the leaf-spring 27 is basically frictionless. (It may be noted that a railway wheel on a metal track experiences considerably less rolling resistance than, say, an inflated rubber tire on an asphalt road: the rolling resistance of the wheel in the drawings is more closely comparable to a railway wheel than to a rubber tire.)

It is not suggested that there will be no rolling-resistance to the motion of the wheel 20 over the ground. The edges or tips of the grousers 23 will slip and slide relative to the ground, especially when the ground is uneven, and the tips will become abraded as a result.

The grousers 23 make the tread of the wheel very aggressive in the traction (forwards-backwards) direction, but the tread has little aggression in the sideways direction. If designers contemplate that sideways aggression of the treads should be increased (to provide a "keel" to maintain directional stability over e.g cambered terrain), lugs can be provided that are in the same plane as the side-lugs 25, but protrude radially outwards, rather than inwards. Alternatively, the designers can arrange the grousers, or the tread-plates, in e.g a herringbone pattern.

The wheel technology as described herein can be applied when the wheels are conventionally steered (i.e at least one of the wheels on the vehicle is steer-pivoted about a yaw-axis of the vehicle), and can be applied when the vehicle is skid-steered (i.e provision is made for driving the left wheels at a different rpm from the right wheels). In the case of skid-steering, it can be beneficial for the resistance of the individual wheel to lateral slippage to be smaller than in the case of yaw-steered wheels.

Figure 5A:
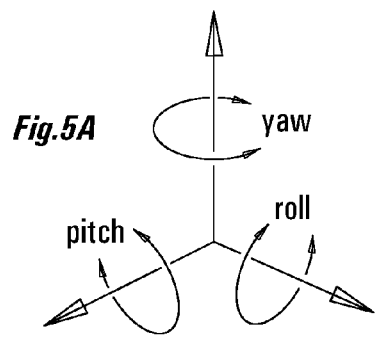
FIG. 5A is a diagram confirming the axes of the three rotational modes of movement with respect to the axis of the vehicle.
Figure 5:
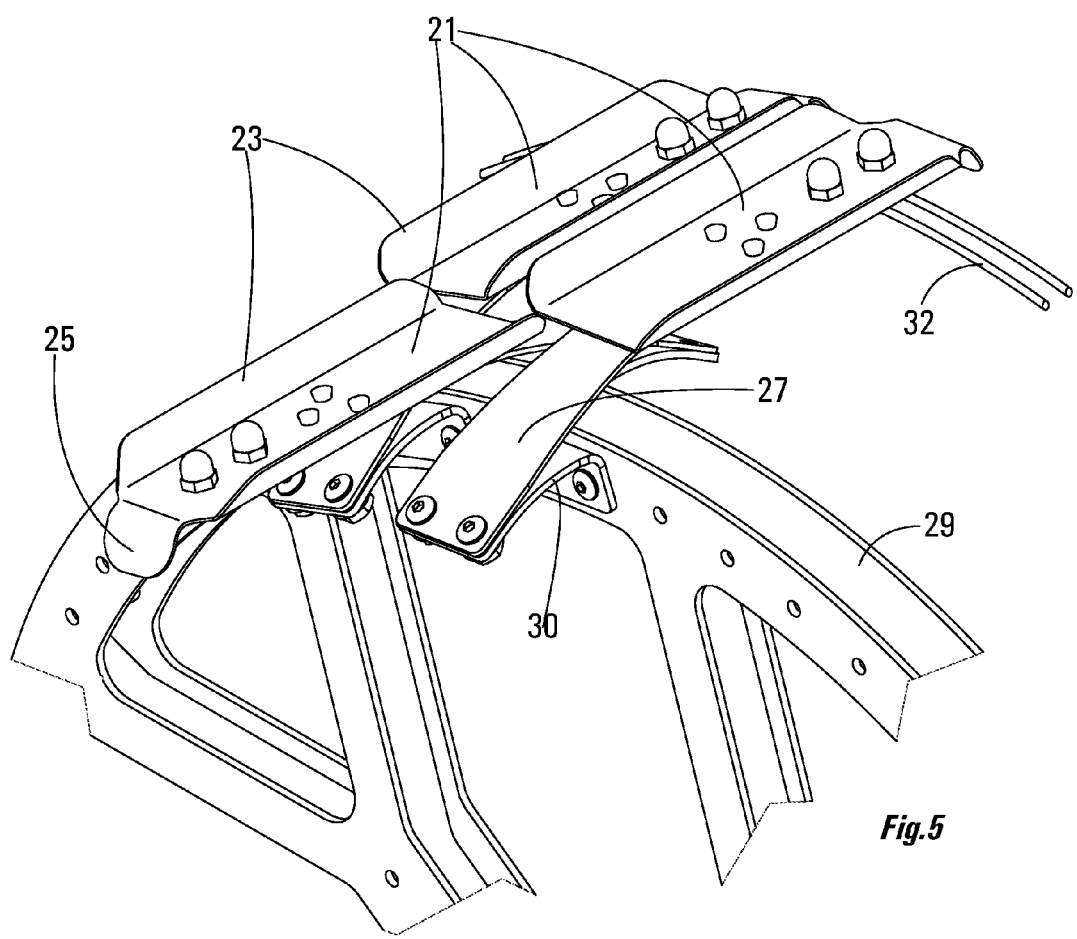
FIG. 5 is the same view again, but omits more of the components.
Figure 8:
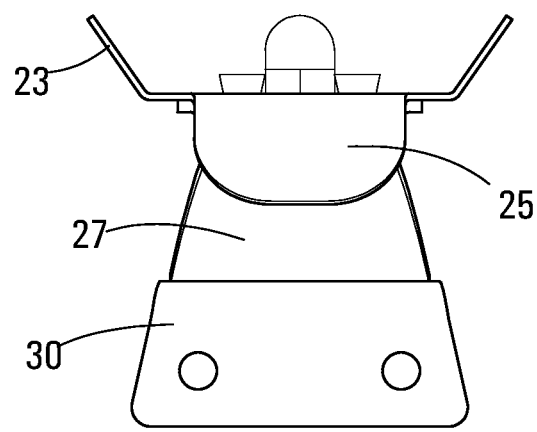
FIG. 8 is a view from the left, of the components shown in FIG. 6.
Figure 7:
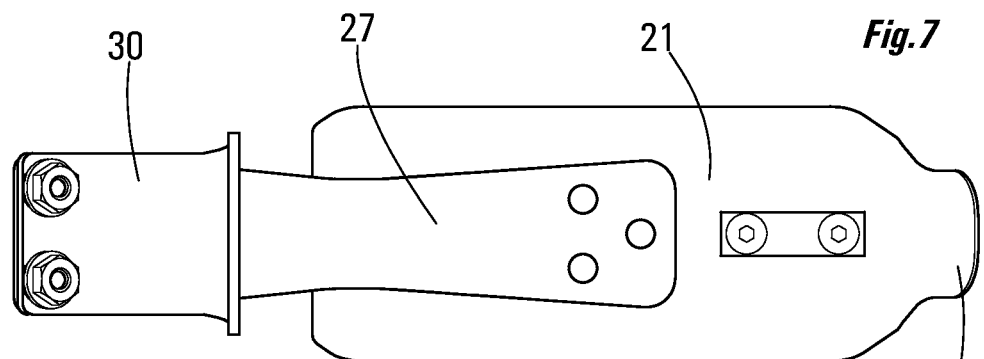
FIG. 7 is a plan view of the components shown in FIG. 6.

The leaf-spring 27, being in sheet form, has good rigidity in the plane of the sheet (i.e in the yaw-mode—see FIG. 5A). Thus, the tread-plates 21 are held firmly in their desired orientations relative to the wheel as a whole, and relative to each other, as each tread-plate 21 in turn deflects under the load on the wheel. Again, the tread-plates are so structured and arranged that they cannot touch each other, during operation of the wheel.

The tread-plates 21 are constrained to maintain their predetermined circumferential spacing, not only by the geometry of the leaf-springs 27, but by wire cables 32, to which each tread-plate 21 is clamped. The cables 32 are of fixed hoop-length. The hoop-cables 32 are not elastic.

The hoop-cables 32 are arranged such that the leaf-springs 27, acting on the tread-plates 21, keep the cables 32 under tension. The manner in which the sizes of the hoop-cables are related to the spring-rates of the tread-spring, and to the forces and deflections required of the tread-springs, may be explored as follows.

Three positions or conditions of the tread-spring are of interest, namely:
  the no-stress position of the tread-spring, which occurs when the hoop-cables are not present on the wheel;
  the cable-taut position of the tread-spring, which occurs when the hoop-cables are in place and the wheel is unloaded (this is the position shown in FIG. 6); and
  the bottomed-out position of the tread-spring, which occurs when the tread-unit is under heavy load, and has bottomed out against the rim.

The overall-deflection-capability of the tread-spring is the travel of the spring between its no-stress position and its bottomed-out position. The actually-enabled-deflection of the tread-spring is the travel between its cable-taut position and its bottomed-out position.

Typically, the designers will so configure the components of the wheel that the actually-enabled-deflection of the tread-spring is about half of the overall-deflection-capability of the tread-spring. Expressing the preferred limits in this regard, the actually-enabled-deflection of the tread-spring should be between thirty percent and seventy percent of the overall-deflection-capability of the tread-spring.

Figure 6:
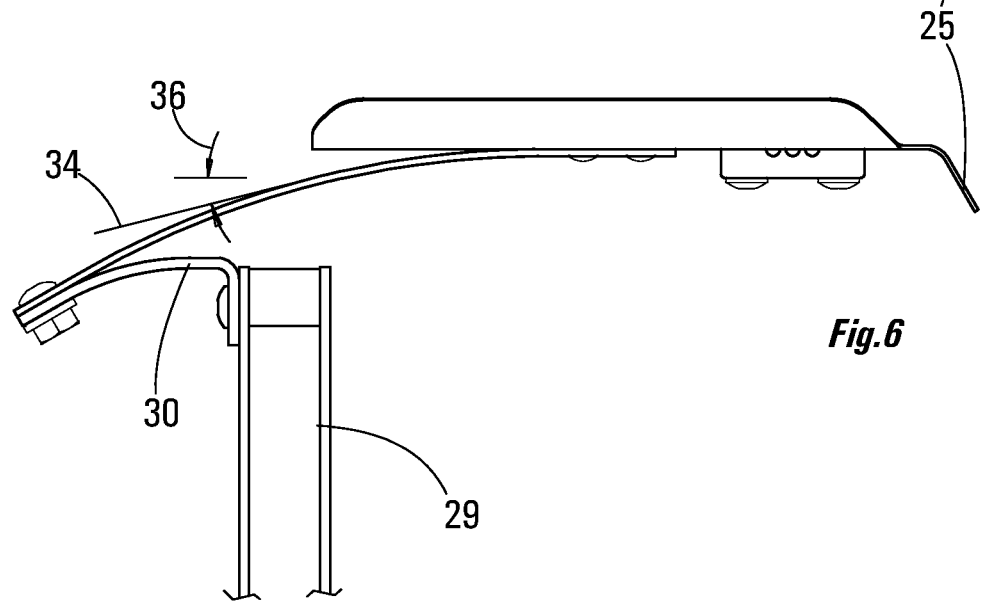
FIG. 6 is cross-sectional view of the wheel of FIG. 1, taken on the line VI-VI, omitting some of the components.

As will be understood from FIG. 6, the angle of the tread-plates to the horizontal will change as the spring deflects. Typically, designers will configure the tread-units and the hoop-cables such that the tread-plates are substantially horizontal (i.e as shown in FIG. 6) when the springs are in their cable-taut position.

The tread-plates 21 and the leaf-springs 27 form tread-units, comprises the assembly of. The spring-brackets are unitary with the components of the rim-spokes-hub-unit 29. As shown, in FIGS. 1-8, there are as many leaf-springs as tread-plates, and the leaf-springs correspond to the tread-plates on a one-on-one basis. Other arrangements are contemplated, in which e.g two tread-plates share one leaf-spring, or one tread-plate is shared by two leaf-springs.

The unstressed mass of springs and tread-plates hold the cables in place in a highly stable manner, even though the bottom tread is deflected radially inwards (and the tread-unit and cables are flexible enough to deflect inwards at the bottom The leaf-spring 27 can deflect to allow its tread-plate 21 to move radially (with respect to the wheel axis) about the roll-axis (which is the main suspension movement), and to allow the tread-plate to rock about the pitch-axis, as will occur when moving over uneven ground. But rotation or twisting of the tread-plate about the yaw-axis is firmly resisted by the geometry of the spring, and by the presence of the wire-cables.

In the alternative wheel shown in FIGS. 9-14, there is only one hoop-set of tread-plates 41, and the tread-plates 41 span right across the width of the wheel 40. Each tread-plate 41 is supported by two tread-springs 47.

The single tread-plates 41 of the wheel of FIGS. 9-14 are a little less compliant than the separate left and right tread-plates of FIGS. 1-8, in respect of traction-engagement with uneven ground.

Another difference is that each tread-plate 41 forms a triangle with its two tread-springs 47. This may be contrasted with the tread-plate 21, which is supported by its single tread-spring 27 in cantilever mode. Thus, the tread-plate 41 is positioned or located with respect to the rim-spokes-hub-unit 29 considerably more robustly than is the tread-plate 21. The suspension travel, spring-rate, etc are, or can be, the same in both designs.

As may be understood from FIG. 13, the long tread-plate 41, in spanning over the rim of the wheel, is provided with a travel stop in respect of the up/down suspension movement, in that the tread-springs 47 cannot deflect beyond the point at which the tread-plate 41 bottoms out against the rim. (In the FIGS. 1-8 design, the tread-plates could also bottom against the rim.)

In the FIGS. 9-14 design, the hoop-cables 32 are clamped to the tread-plates 41 using the same bolts that clamp the tread-springs 47 to the tread-plates 41.

It may be noted that, in the wheels depicted herein, there are no moving pivots, nor any points at which components of the wheel might rub together. All the movements performed by the wheel are guided and constrained by the tread-springs and the hoop-cables, without any rubbing contact between components.

Thus, the tread-springs perform the dual function of providing resilient deflection capability, to enable suspension and other movements, and at the same time the tread-springs keep the various components in their correct geometrical relationships. In this latter function, the tread-springs are assisted by the hoop-cables. Thus, the hoop-cables permit the leaf-springs to be designed primarily to have the desired deflection characteristics, without the need to compromise because of the need to hold the components in their positions.

The configuration of the hoop-cables and of the leaf-springs, and the manner of mounting the springs to the rim, and of mounting the tread-plates to the leaf-springs, as shown, combine to create very good resilience over a long radial travel of the tread-plate, and to create good compliance which enables the tread-plate to accommodate itself to the uneven ground. At the same time, the tread-plates are firmly constrained against moving away from their predetermined positions relative to each other. The tread-plates can be mounted fairly closely together, but there is little risk of the tread-plates touching each other.

Of course, the wheels must be capable of operating over uneven ground, climbing slopes, coping with adverse cambers, and so on. The tread-plates must cope with terrain that subjects the plates to twisting and tilting. including traversing over rocks small and large. The wheel must not lose traction.

The desired movements include:
the main suspension movements, i.e up/down deflections of the tread-plates (along the yaw-axis of the vehicle) as they contact the ground once per revolution of the wheel, which involves simple bending of the leaf-spring about the roll-axis.
tipping/rocking of the tread-plates about the pitch-axis, which involves the leaf-spring undergoing twisting deflection about the pitch-axis.
Movements to be resisted include:
circumferential movement of the tread-plate in response to traction forces on the tread-plate. The illustrated layout puts these forces in the plane of the sheet metal of the leaf-spring, which maximizes the resistance of the leaf-spring to circumferential deflection. However, given that the leaf-spring is light and thin, the leaf-spring would or might buckle under heavy traction (or braking), in the absence of preventive measures (e.g in this case, the provision of the hoop-cables)

The manner in which the hoop-cables interact with and assist the leaf-spring, during operation, may be related to the different modes of movement of the tread-plate, as shown by the following tabulations.

Pitch-mode tipping of the tread-plate:
what need for flexibility/rigidity
good flexibility—for tread compliance on uneven ground,
what does the leaf-spring provide
the leaf-spring provides the good flexibility,
might the leaf-spring buckle in pitch-mode, without cables
no
do the cables help prevent buckling in pitch-mode
no, but buckling not likely.
Roll-mode movement of the tread-plate:
what need for flexibility/rigidity
good flexibility—this is the main suspension movement,
what does the leaf-spring provide
the leaf-spring provides the good flexibility,
might the leaf-spring buckle in roll-mode, without cables
no
do the cables help prevent buckling in roll-mode
no, but buckling not likely.
Yaw-mode twisting of the tread-plate:
what need for flexibility/rigidity
good rigidity required for traction (and braking), to resist yaw-twisting,
what does the leaf-spring provide
the leaf-spring resists yaw-twisting.
might the leaf-spring buckle in yaw-mode, without cables
yes, the leaf-spring likely would buckle under yaw-mode twisting.
do the cables help prevent buckling in yaw-mode
yes, the cables add to the rigidity with which the leaf-spring resists yaw-mode twisting and buckling.

Without the cable, the leaf-springs could hardly be designed to have the required low-rate flexibility to provide up/down suspension movement (roll-mode rotation of the leaf-spring), and yet strong enough not to buckle under yaw-mode twisting of the leaf-spring.

The hoop-cable retains its circumferential position, relative to the rim, very rigidly. That is to say, the hoop-cable cannot move circumferentially with respect to the rim. In the FIGS. 1-8 wheel, there are thirty-one tread-plates attached to each hoop-cable (being sixty-two tread-plates per wheel).

When the wheel is under load, at least one, and assumedly perhaps three, of the hoop-set of tread-plates will be making actual touching contact with the ground. Thus, the positional-rigidity of the cable arises because the hoop-cable is attached to the twenty-eight tread-plates that are clear of the ground. The result, as far as the three tread-plates that are in contact with the ground are concerned, is that the rigid retention of the position of the cable relative to the rim is enough to over-ride any tendency of the distal ends of the three tread-plates to move out of circumferential alignment. The heavier the traction forces, the greater the forces tending to make the distal ends of the tread-plates move circumferentially.

At the same time, the cables do not inhibit or interfere with the suspension (roll-mode tipping) movements of the plates. The cables also do not interfere with pitch-mode tipping movements, and it can be beneficial for the tread-plates to be able to tip or rock in the pitch-mode, for good traction on rough ground.

When a particular tread-plate is in contact with the ground, the ground-contacting tread-plate will move radially inwards, as the leaf-spring deflects in the roll-mode. It follows that the inwards-moving ground-contacting tread-plate and its neighbours will move towards each other in the circumferential sense. The tread-plates should be positioned far enough apart, circumferentially, that they do not touch.

When the neighbouring ground-contacting tread-plates approach each other circumferentially, as a result of suspension movement, of course the portion of the hoop-cable between those tread-plates slackens. Thus, the hoop-cables do not absolutely prevent the tread-plates (and the tread-springs) from undergoing yaw-mode deflection. Rather, the hoop-cables act to prevent the tread-springs from over-deflecting, away from their natural or unstressed positions, to the extent that buckling of the tread-spring might be a problem.

Thus, the strength and rigidity of the thin, light, leaf-spring is enough to cope with the minor deflections permitted by the slackness of the hoop-cables. The cables prevent (i.e inhibit) buckling under gross deflections.

In short, the individual tread-springs are thin and light, and vulnerable to being damaged by gross distortions due to traction forces on the bottom tread-plates. But the hoop-cable makes the combined strength and rigidity of all the other (light) tread-springs available to assist the tread-spring of the ground-contacting tread-plate to support heavy traction forces. Notionally, only one of the tread-units undergoes suspension deflection at one time. But the cable is attached to all thirty-one, which leaves say twenty-eight tread-units still holding the cable steady. Thus the cables themselves are highly resistant to moving out of their desired position.

It might be possible to design the tread-springs to have enough strength such that each tread-spring on its own without mechanical support—via the hoop-cables—from the other tread-springs would be able to cope with the desired tipping/rocking/twisting movements of the tread-plates. However, tread-springs that were indeed able to support themselves in that manner would not be the light, thin, flexible, leaf-springs as depicted herein. The hoop-cables, by linking all the tread-plates together circumferentially, enable the tread-plates to support each other against any circumferential deflections.

The wheel of FIGS. 1-8 has two hoop-sets of tread-units, being left and right hoop-sets. A left hoop-cable connects the thirty-one tread-plates of the left hoop-set, and a right hoop-cable connects the thirty-one tread-plates of the right hoop-set. The left tread-springs span over the rim, being fast to brackets on the right side of the rim, while the right tread-springs also extend over the rim, being fast to brackets on the left side of the rim. Thus, the tread-springs can be of a good length, as required in order to provide good deflection characteristics. In fact, from this standpoint, preferably the flex-length of the tread-springs is half the overall width of the wheel, or more.

This same preference for the flex-length of the tread-springs to be half the overall width of the wheel or more is achieved also in the wheel of FIGS. 9-14.

The wheel of FIGS. 9-14 has only one hoop-set of tread-units. The thirty-one tread-plates extend across the width of the wheel. Left and right hoop-cables connect the outer ends of the tread-plates.

In FIGS. 9-14, there are again sixty-two tread-springs, but now disposed two per tread-plate. The tread-springs do not span over the rim, but rather the left tread-springs are fast to brackets on the left side of the rim. The desired long flex-length of the springs is achieved by setting the springs at an angle. In addition to enabling the springs to be of a good length, setting the springs at an angle has the effect of triangulating the tread-unit, whereby the tread-plates are supported against circumferential movements relative to the rim very strongly and rigidly, even without the hoop-cables.

Designers might prefer to attach the tread-springs directly to the sides of the rim of the rim-spokes-hub component. However, the provision of the brackets means that the plane of the sheet metal of the leaf-spring lies in the best orientation to ensure that suspension-deflection of the spring can take place smoothly and with little chance of adverse distortions of the sheet metal.

As mentioned, in both wheels, under heavy suspension deflection, the tread-unit is protected from possibly-damaging distortions by bottoming against the rim. In the FIGS. 1-8 wheel, it is the tread-springs that actually make contact with the rim, whereas in the FIGS. 9-14 wheel, it is the tread-plates that make contact with the rim; designers might consider that the tread-plate would be more able to withstand forceful contact with the rim than the tread-spring.

It is recognized that, in the wheels as depicted, the leaf-springs can be so configured as to create favourable suspension and strength characteristics. In particular, the leaf-spring has a thickness-dimension which lies predominantly radially with respect to the wheel. Also, the width-dimension of the leaf-spring lies in a plane that is predominantly tangential with respect to the wheel. (The word predominantly, here, signifies that the dimensions have major components in the said directions.)

Preferably, the portion of the tread-spring that, in operation, is capable of undergoing resilient deflection, has a flex-length that is half the width of the wheel, or more.

As shown in FIG. 6, the line 34 is a tangent drawn at a point on the curved surface of the line leaf-spring 27. The tangent 34 lies at an angle 36 to a line that is parallel to the axis of the wheel. Preferably, at any point on the flex-length of the leaf-spring, the angle is thirty degrees or less.

Preferably, the spring is also so disposed, in the wheel, that the thickness dimension (i.e the distance between the surfaces of the sheet material) is aligned with a radius of the wheel, or lies within thirty degrees of a radius.

Each point on the flex-length of each leaf-spring has a tread-spring radius, being a radial line joining the wheel-axis to that point of the tread-spring, and preferably the tread-unit is so mounted with respect to the rim that the plane of the sheet metal of the tread-spring at the point lies within thirty degrees of being perpendicular to the tread-spring radius at the point.

A wheel-radius of a point in the wheel is a line that is perpendicular to the wheel-axis, and extends from the wheel-axis to the point, and preferably the wheel-radius of the proximal end of the leaf-spring is shorter than the wheel-radius of the distal end.

In respect of each tread-unit, preferably the or each tread-plate has no physical attachment to the rim except through the respective tread-springs, and preferably the hoop-cables have no direct physical connection to the rim.

The numerals used in the drawings are listed as:

20 wheel
21 tread-plates (sheet titanium)
23 traction-lugs or grousers of tread-plates
25 side-lugs of tread-plates
27 leaf-springs or tread-springs (spring steel)
29 rim-spokes-hub unit
30 spring mounting rim-brackets
32 hoop-cables
34 tangent to leaf-spring 27
36 angle of tangent
41 tread-plates
43 grousers
47 tread-springs
50 spring mounting rim-brackets.

The invention claimed is:

1. Wheel, wherein:
   the wheel includes a rim, which is fast to a hub of the wheel, for rolling motion about a wheel axis;
   the wheel includes many tread-plates;
   the wheel includes resiliently flexible tread-springs;
   proximal ends of the tread-springs are fast to the rim;
   distal ends of the tread-springs are fast to the tread-plates, whereby the tread-plates and tread-springs form tread-units;
   the tread-units are so configured that:
   (a) the tread-plates are urged radially outwards, with respect to the axis of the wheel, by the resilience of the tread-springs; and
   (b) the tread-plates can move, individually, radially inwards against the resilience of the tread-springs;
   the tread-units are arranged in a hoop-set, or in hoop-sets;
   in respect of the or each hoop-set of tread-plates:
   (a) the hoop-set is so configured that each tread-plate of the hoop-set lies circumferentially between adjacent tread-plates of the hoop-set;
   (b) the hoop-set includes a hoop-cable;
   (c) each one of the tread-plates that make up the hoop-set is fast to the hoop-cable;
   (d) the hoop-cable is of so dimensioned that, the wheel being unloaded and the tread-plates being urged radially outwards by the tread-springs, the hoop-cable is under hoop-tension; and
   (e) the tread-plates are each fastened to the hoop-cable in such manner that, the wheel being unloaded, adjacent tread-plates can approach but cannot separate, circumferentially.

2. A wheel as claimed in claim 1 wherein the wheel is metal.

3. A wheel as claimed in claim 1 wherein the wheel is all metal.

4. A wheel as claimed in claim 1, wherein:
the tread-plates are independent;
the resiliently flexible tread-springs are independent leaf springs;
distal ends of the tread-springs are fast to the tread-plates, whereby the tread-plates and tread-springs form independent tread-units;
the tread-springs are so configured that:
(a) the tread-plates are urged radially outwards, with respect to the axis of the wheel, by the resilience of the tread-springs; and
(b) the tread-plates can move, individually, radially inwards against the resilience of the tread-springs;
(c) the tread-units are restrained, individually, by respective tread springs against movement parallel to the wheel axis;
the hoop cable is inelastic and flexible.

5. A wheel as claimed in claim 4 wherein the wheel is metal.

6. A wheel as claimed in claim 4 wherein the wheel is all metal.

7. An all metal wheel as claimed in claim 6, wherein the tread units are held firmly, individually, by respective tread-springs in position axially relative to the wheel.

8. An all metal wheel as claimed in claim 7, wherein the wheel is so structured that, when the wheel is in an operational loaded condition, and the wheel is rolling over the ground:
the tread-plate of a bottom one of the tread-units makes direct touching contact with the ground;
the tread-spring of the bottom tread-unit deflects radially inwards relative to the axis of the wheel;
in the other tread-units that are clear of the ground, the tread-springs urge the tread-plates radially outwards, against the tension of the hoop cable.

9. An all metal wheel as claimed in claim 8, wherein:
each tread-unit comprises one tread-plate and just one tread-spring that is fast to the rim and to the tread-plate; and
the wheel includes left and right hoop-sets of tread-units, having respective hoop-cables.

10. An all metal wheel as claimed in claim 9, wherein:
in the tread-units of the left hoop-set:
(a) the left tread-plates lie to the left of the rim;
(b) the proximal ends of the left tread-springs are fast to the right side of the rim;
(c) the left tread-springs extend over the rim, and their distal ends are fast to the left tread-plates;
in the tread-units of the right hoop-set:
(a) the right tread-plates lie to the right of the rim;
(b) the proximal ends of the right tread-springs are fast to the right side of the rim;
(c) the right tread-springs extend over the rim, and their distal ends are fast to the right tread-plates.

11. An all metal wheel as claimed in claim 8, wherein:
the wheel includes just one hoop-set of tread-units;
each tread-unit comprises left and right tread-springs and just one tread-plate;
the left and right tread-springs are fast to the rim and to the tread-plate;
left and right hoop-cables are fast to left and right ends of the tread-plates.

12. An all metal wheel as claimed in claim 11, wherein:
the tread-plates span across the width of the wheel, over the rim;
the proximal ends of the left tread-springs are fast to the left side of the rim;
the distal ends of the left tread-springs are fast to the left end of the tread-plate;
the proximal ends of the right tread-springs are fast to the right side of the rim;
the distal ends of the right tread-springs are fast to the right end of the tread-plate.

13. An all metal wheel as claimed in claim 8, wherein:
the wheel includes rim-brackets, which are fast to the rim;
each rim-bracket is formed with a rim-bracket surface, to which the proximal ends of the tread-springs are fast.

14. An all metal wheel as claimed in claim 8, wherein, in respect of each tread-unit, the or each tread-spring is a leaf-spring, being of sheet metal.

15. An all metal wheel as claimed in claim 14, wherein the wheel is so configured that:
the thickness-dimension of the leaf-spring lies predominantly radially with respect to the wheel;
the width-dimension of the leaf-spring lies in a plane that is predominantly tangential with respect to the wheel; and
the length-dimension lies predominantly parallel to the wheel-axis of the wheel.

16. An all metal wheel as claimed in claim 14, wherein:
the leaf-spring has a flex-length comprising the length of that portion of the tread-spring that, in operation, is capable of undergoing resilient deflection; and
the flex-length is half of the overall width of the wheel, or more.

17. An all metal wheel as claimed in claim 16, wherein, at every point on the flex-length of the leaf-spring, a tangent to the leaf-spring at that point lies at an angle that is within thirty degrees of being parallel to the wheel-axis of the wheel.

18. An all metal wheel as claimed in claim 16, wherein:
each point on the flex-length of each leaf-spring has a tread-spring radius, being a radial line joining the wheel-axis to that point of the tread-spring;
the tread-unit is so mounted with respect to the rim that the plane of the sheet metal of the tread-spring at the point lies within thirty degrees of being perpendicular to the tread-spring radius at the point.

19. An all metal wheel as claimed in claim 14, wherein:
a wheel-radius of a point in the wheel is a line that is perpendicular to the wheel-axis, and extends from the wheel-axis to the point;
the wheel-radius of the proximal end of the leaf-spring is shorter than the wheel-radius of the distal end.

20. An all metal wheel as claimed in claim 8, wherein the hoop-cables are of such hoop-length that the actually-enabled-deflection of the tread-spring is between thirty percent and seventy percent of the overall deflection-capability of the tread-spring.

21. An all metal wheel as claimed in claim 8, wherein:
in respect of each tread-unit the or each tread-plate has no physical attachment to the rim except through the respective tread-springs; and
the hoop-cables have no direct physical connection to the rim.

22. An all metal wheel as claimed in claim 8, wherein the rim is part of a unitary integrated hub-spokes-rim component of the wheel.

23. An all metal wheel as claimed in claim 8, wherein all components of the wheel are of metal and
the tread-plates are of titanium;
the tread-springs are of spring-steel.

* * * * *